United States Patent [19]
Rolfe et al.

[11] Patent Number: 5,881,304
[45] Date of Patent: Mar. 9, 1999

[54] INCIDENCE GRAPH BASED COMMUNICATIONS AND OPERATIONS METHOD AND APPARATUS FOR PARALLEL PROCESSING ARCHITECTURE

[75] Inventors: David B. Rolfe, West Hurley; Andrew P. Wack, Wappingers Falls, both of N.Y.

[73] Assignee: International Business Machines Corporation, Armonk, N.Y.

[21] Appl. No.: 821,521

[22] Filed: Mar. 21, 1997

[51] Int. Cl.$^6$ ...................................................... G06F 13/00
[52] U.S. Cl. ................... 395/800.11; 395/800.29; 395/200.73
[58] Field of Search ............................ 395/800.4, 800.12, 395/800.2, 200.73, 200.68, 800.28, 200.66, 182.68, 800.9; 370/407

[56] References Cited

U.S. PATENT DOCUMENTS

| | | | |
|---|---|---|---|
| 5,170,393 | 12/1992 | Peterson et al. | 370/255 |
| 5,280,607 | 1/1994 | Bruck et al. | 395/182.02 |
| 5,313,645 | 5/1994 | Rolfe | 395/800.11 |
| 5,485,626 | 1/1996 | Lowlor et al. | 395/683 |
| 5,561,805 | 10/1996 | Bruck et al. | 395/200.68 |
| 5,594,918 | 1/1997 | Knowles et al. | 395/800.15 |
| 5,630,162 | 5/1997 | Wikiuson et al. | 395/800.2 |
| 5,669,008 | 9/1997 | Galles et al. | 395/800.12 |
| 5,701,416 | 12/1997 | Thorson et al. | 395/800.11 |
| 5,757,628 | 4/1998 | Birrittella et al. | 395/800.11 |

OTHER PUBLICATIONS

"Scheduling of Unstructured Communication on the Intel iPSC/860*", by J. Wang et al., School of Computer and Information Science, Syracuse University, 1994 IEEE, 1063–9353/94, pp. 360–369.

*Primary Examiner*—Larry D. Donaghue
*Attorney, Agent, or Firm*—Marc A. Ehrlich

[57] ABSTRACT

A method and apparatus for performing operations at nodes in a distributed network of interconnected nodes wherein a two dimensional array is arranged with each of the nodes represented by a single row heading and a single column heading. The intersections of row and column headings at which operations are to be performed may be provided with a token indicative of this condition. The token may further be associated with operation parameters defining the performance of the operations at the two nodes represented by the intersecting row and column headings.

11 Claims, 8 Drawing Sheets

INCIDENCE GRAPH BASED COMMUNICATIONS AND OPERATIONS METHOD AND APPARATUS FOR PARALLEL PROCESSING ARCHITECTURE

FIELD OF THE INVENTION

The present invention relates to the field of parallel computing systems comprising a plurality of interconnected processing units or nodes, and particularly to a communication method and apparatus wherein an incidence graph is utilized to define communication patterns used for passing messages between processing nodes over the interconnection network of a parallel computing system. The invention enables the implementation of any communication pattern that is of interest in the parallel processing system regardless of the number of interconnected nodes therein. Moreover, the invention additionally includes the use of the incidence graphs to drive other non-communication based operations at the processing nodes in the parallel computing system.

BACKGROUND OF THE INVENTION

Parallel processing systems have been utilized as an expedient approach for increasing processing speeds to create computer systems which can manage voluminous data and handle complex computational problems quickly and efficiently. A number of parallel or distributed processing systems are well known in the prior art.

A massively parallel processing system may include a relatively large number, often in the hundreds or even thousands, of separate, though relatively simple, microprocessor based processing elements inter-connected through a communications fabric typically comprising a high speed packet network in which each of the processing elements appears as a separate node on the network. Messages, in the form of packets, are routed over the network between these processing elements to enable communication therebetween. Each processing element typically includes a separate microprocessor and associated support circuitry including but not limited to storage circuitry such as random access memory (RAM), and read only memory (ROM) circuitry and input/output circuitry, as well as a communication sub-system comprising a communications interface and associated hardware and software which enable the processing element to interface with the network. The communication fabric permits simultaneous or parallel execution of instructions by the processing elements or nodes.

In such a parallel processing system including a number of interconnected nodes, the number of possible combinations of internode communications (or communication patterns between the nodes) grows as $2^{n(squared)}$ where n represents the number of nodes capable of passing messages between each other in the system. Thus, a distributed computing system having as few as eight nodes may exhibit over $2^{64}$ (or approximately $1.845*10^{19}$) different potential communication patterns.

While it is not practical to implement a system which exercises every possible communication pattern in a parallel computing system, it is desirable to enable a system to quickly and efficiently exercise any communication pattern which is of interest at any time.

For example, and without loss of generality, consider the generation of test programs for testing the interconnected nodes in a typical parallel processing system. Current test programs implement fixed communication patterns, with the consequence that the communication subsystem for the parallel computing system is not well tested. A typical current generation test program is generated to test a particular communication pattern. The creation of such a test program is a labor intensive process entailing the dedication of considerable programming resources. Thus, the generation of a number of such test programs, to test a variety of communication patterns which may be implemented in a parallel computing system would consume a significant amount of programming resource. Consequently, given the state of current testing art the creation of test programs to achieve adequate test coverage of communication patterns in distributed computing systems is a cost prohibitive endeavor.

The use of graphical analysis to define abstract binary relationships has long been understood. Parallel computing system topologies have been constructed utilizing graphical analysis techniques which achieve higher fault tolerance. For example, U.S. Pat. No. 5,280,607 entitled Method and Apparatus For Tolerating Faults in Mesh Architectures, issued on Jan. 18, 1994 to Bruck et al. describes the construction of fault tolerant mesh architectures to be used in parallel computing systems. The invention is implemented via the arrangement of a graphical construction wherein the nodes in a circulant graph represent identical components and the edges of the graph represent communication links between the nodes of a fault tolerant mesh designed for a given target mesh. For a predetermined number of possible faults, the so-designed fault tolerant mesh is guaranteed to contain, as a subgraph, the graph corresponding to the target mesh.

Graphical analysis has additionally been employed to implement improved message routing between processing nodes in a parallel computing system. U.S. Pat. No. 5,170,393 issued to Peterson et al., entitled "Adaptive Routing of Messages in Parallel and Distributed Processor Systems", describes a method and apparatus for reducing message latency between communicating nodes by implementing a heuristic-based adaptive routing algorithm which prunes failing communication path segments from consideration, thereby driving a node to node communication to success or failure in a minimal amount of time. The routing model described by Peterson et al. utilizes a partitioned interconnection graph of the system to define a specific set of nodes which must be visited while pruning the network for a successful path between the source and destination nodes. The pruning algorithm may be implemented on an adjacency matrix which includes a one at the intersections of nodes which are separated by one hop (or a single edge of the interconnection graph).

In an article authored by Wang et al., entitled "Scheduling of Unstructured Communications on the Intel iPSC/860", appearing in Supercomputing '94, Proceedings, pp. 360 et seq., 1994, a communication matrix representing a predetermined communication pattern for a highly parallel computing system is decomposed via a number of algorithms into partial permutations. These partial permutations are used to schedule all-to-many personalized communications for the highly parallel computing system so as to avoid node and link contention.

The communication matrix is used, in the context of the Wang et al. article, as an input for the scheduling algorithms, and the invention contemplates scheduling messages for a known communication pattern so as to avoid contention. Thus, Wang et al. describe the capture of a communication pattern for an existing program in incidence graph form in order to optimize the execution of that program.

U.S. Pat. No. 5,313,645, issued to Rolfe, entitled "Method For Interconnecting And System Of Interconnected Processing Elements By Controlling Network Density", (commonly assigned to the present assignee and incorporated herein by reference) describes, inter-alia, a method for interconnecting processing elements so as to balance the number of connections per element against the network diameter. The patent teaches the use of a network connection algorithm to accomplish the novel interconnection technique. Though directed toward defining physical node interconnections (i.e. via cable links or other means) in a massively parallel computer network, the algorithm may be adapted to the generation of logical communication paths for exercising a number of such patterns within a parallel computing system. Thus, the creation of incidence graphs corresponding to a set of important communication patterns which may include hypercubes and n-dimensional toruses of varying diameter, containing interconnected arcs, may be generated via this algorithm embodied in a single computer program.

Utilizing this automatically generated set of communication patterns for a parallel processing network as an input, it is possible to implement a system wherein these incidence graphs (or communication matrices) serve to direct the passage of messages between the nodes in a parallel computing system so as to implement any communication pattern which may be of particular interest for the parallel computing system. Moreover, in such a system, an incidence graph may be alternatively utilized to drive the execution of non-communication based operations at the processing nodes in the parallel computing system.

SUMMARY OF THE INVENTION

The foregoing problems and the shortcomings of the prior art are overcome and additional advantages are provided by the present invention in which a method and apparatus for passing messages between nodes over a network of interconnected nodes is described.

In a first embodiment, a two dimensional array is arranged with representations of each node appearing once as a row heading, and once as a column heading. In the array, the intersections of the row and column node representations are each provided with a token which is associated with an indication of whether the passing of messages between the nodes represented by the intersecting node representations will take place. If a message is to be passed between two nodes represented by intersecting node representations in the two dimensional array, the token is additionally associated with message parameters governing the type of message to be passed and the manner in which it is to be passed. Thus, the two dimensional array comprises a communication pattern to be exercised by the nodes over the network. Each node considers the array contents to determine to which other nodes it will send messages and from which other nodes it will receive messages. The messages are thus passed between the nodes in accordance with the token representations in the array.

In another embodiment, the passing of messages between nodes over the network may be accomplished via reference to a host node, having a host node memory. In this embodiment, a subset of the tokens at the intersections of node representations may take the form of zeros, indicating that no messages are to be passed between the nodes represented by the intersection of node representations in the two dimensional array. Other tokens in the array may be associated with addresses of the host node memory. These tokens serve to indicate that messages are to be passed between the nodes represented thereby. The host node memory locations indicated by the addresses associated with the tokens at these intersections store the message parameters for the type of message to be passed between the nodes and the manner in which it is to be passed including, but not limited to the operations that are to be performed upon the message data that is to be received at the receiving node.

In still another embodiment, successive versions of the aforementioned two dimensional array are arranged so as to form a three dimensional array, with the third dimension comprising the successive versions of the two dimensional array. In each successive version of the two dimensional array, the tokens at each of the intersections of the node representations may be associated with different indications, thereby comprising a different communication pattern for the network of nodes in each array. In this embodiment, the communication pattern embodied in each of the two dimensional arrays may be implemented via a single set of instructions, by the nodes in the network of interconnected nodes thereby expanding the uses to which the system may be applied.

Thus, with the present invention, an array which may be generated via known means such as a computer program may be utilized to implement any communication patterns that is of interest in the parallel processing system. In this manner, expanded utilization for a parallel network of processing nodes may be expediently achieved.

In a further application of the present invention, a two dimensional array may be arranged with representations of each node appearing once as a row heading and once as a column heading. Tokens may be provided at the row and column intersections which are associated with an indication of whether non-communication based operations, such as arithmetic or diagnostic operations are to be performed thereat, the token is additionally associated with operation parameters, including the instructions for such operations to be performed, and any operands necessary for carrying the operations to completion. Thus, in this alternative embodiment the two dimensional array represents an operation matrix for the network, wherein each node considers the array to determine the operations it will perform.

BRIEF DESCRIPTION OF THE DRAWINGS

The subject matter which is regarded as the invention is particularly pointed out and distinctly claimed at the conclusion of the specification. The foregoing and other features and advantages of the invention will be apparent from the following detailed description in conjunction with the accompanying drawings, in which:

DETAILED DESCRIPTION OF THE PREFERRED EMBODIMENTS OF THE INVENTION

In accordance with the principles of the invention, a method and apparatus for passing messages between nodes over a network of nodes, particularly, though not exclusively between computing elements in a massively parallel computing system, is disclosed. Before turning to our invention in greater detail, it will be instructive to illustrate, by way of several exemplary communication patterns, the efficiencies that may be realized by implementing the inventive method and associated apparatus of the present invention.

Figure 1:
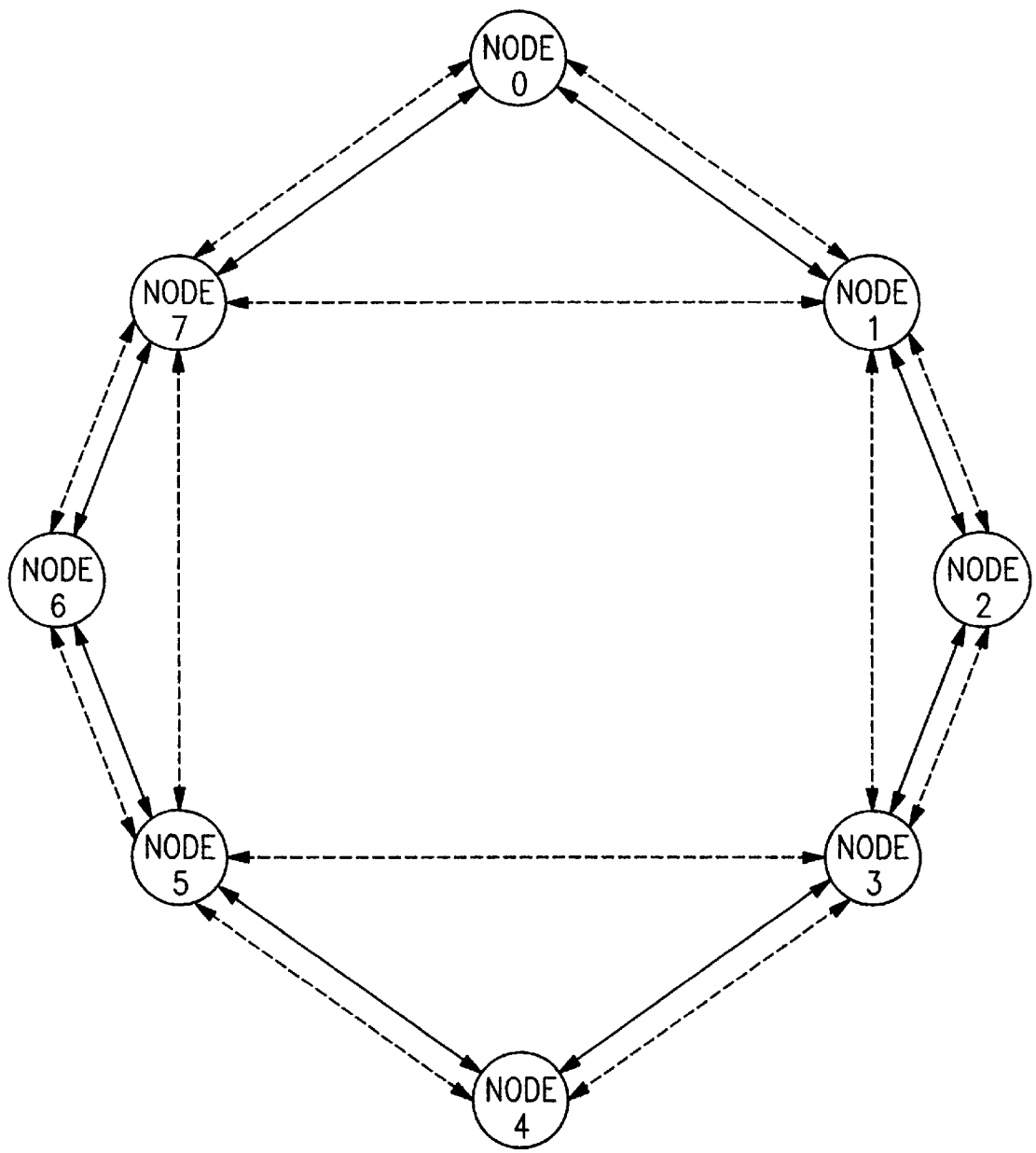
FIG. 1 depicts ring communication topologies for eight processing nodes.

Referring to FIG. 1, a simple ring communication pattern for a set of eight processing nodes (0–7) is illustrated. It is important to note that the connections between the illustrated nodes represent logical communications or a so-called communication topology or communication pattern and do not represent the physical topology of the interconnected nodes. In the illustrated communication pattern, each of the nodes is instructed to send a message, represented by the solid, doubled-arrowed line, to its nearest neighboring nodes and to receive a message from these nodes as well. Thus, for example in FIG. 1, node 1 will transmit messages to node 0 and node 2, and will receive messages from nodes 0 and 2 as well. It would be necessary to generate a particular application program in order to implement this communication pattern in a parallel processing system. If a slightly different communication pattern were of interest in the same parallel processing system it would be necessary to generate a separate application program to implement this second pattern. For example, a ring communication topology, in which each node transmits messages, represented in FIG. 1 by the dashed, doubled arrowed lines, to its nearest neighboring nodes as well as nodes that are once removed (i.e. for example, via reference to FIG. 1, a topology in which node 1 will transmit messages to nodes 0 and 2 and to nodes 7 and 3) would require the independent generation of another separate communication program distinct from the program generated to implement the first exemplary simple ring communication topology.

Figure 2:
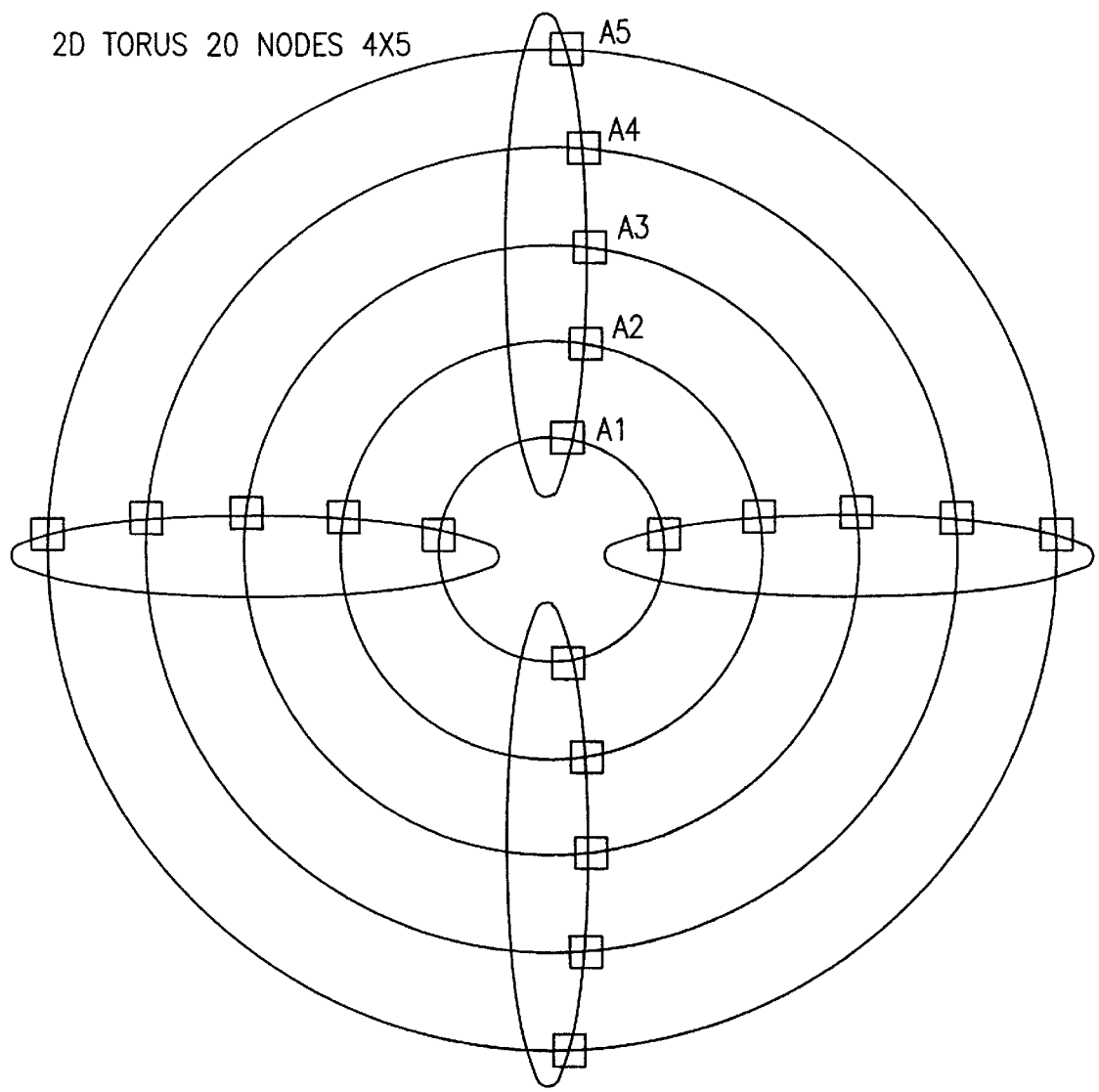
FIG. 2 depicts a two-dimensional torus communication topology for twenty processing nodes.

Turning now to FIG. 2, a communication pattern for a two dimensional torus is illustrated. In the two dimensional torus, each node in the illustrative communication topology communicates with its four nearest neighbors. For example, node $A_0$ communicates with nodes $A_1$, $A_2$, $A_3$, and $A_4$. It would therefore be required to generate another separate communication program which implements this communication pattern to enable messages to be passed between the nodes in the parallel processing system in this manner.

Figure 3:
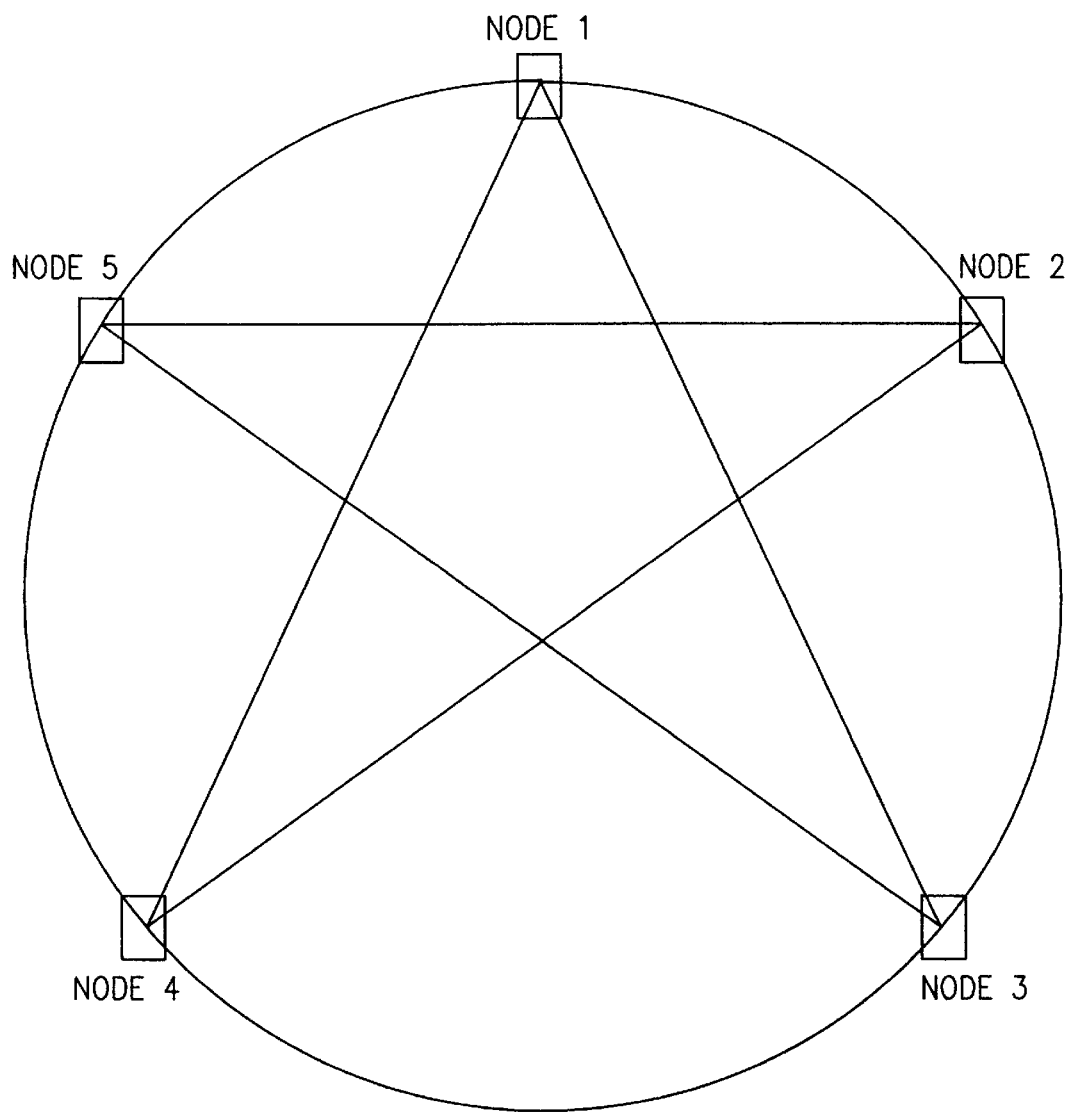
FIG. 3 depicts an all-to-all communication topology for five processing nodes.

As a final example for consideration, FIG. 3 depicts an any to any communication pattern for 5 nodes. For example, node 1, as illustrated, communicates with any of nodes 2, 3, 4 and 5. Again, this communication pattern would require the generation of a separate program to implement these inter-node communications for the communication fabric of the parallel processing system.

From the foregoing it can be seen that the implementation of distinct communication patterns requires the concomitant generation of separate application programs for each pattern under consideration in a given parallel processing system. Since the creation of parallel program is a time intensive endeavor and since there are $2^{n(squared)}$ distinct patterns capable of consideration in a computer network having n nodes, it is evident that it is impractical to individually generate separate programs for all communication patterns to be implemented in a particular network. There exists therefore, a need for efficiently generating a program for execution by processing nodes in a parallel processing system wherein any communication pattern of interest may be implemented via the single parallel program. Such a need has not been adequately addressed in the prior art.

An aspect of the present invention pertains to this unaddressed need. In accordance with a particular aspect of the invention a method and associated apparatus are disclosed whereby a single application program may be generated which can implement any communication pattern among a plurality of computing nodes which may be of interest to a designer. In operation, a set of incidence graphs may be generated which serve to define the communication patterns that the execution of the application program will implement. Via reference to incidence graphs having row and column headings corresponding to the processing nodes, each of the processing nodes is enabled to pass messages to other processing nodes in the parallel processing system in accordance with the inclusion of a token at the intersection in the incidence graph corresponding to the two nodes between which messages are to be passed.

Figure 4:
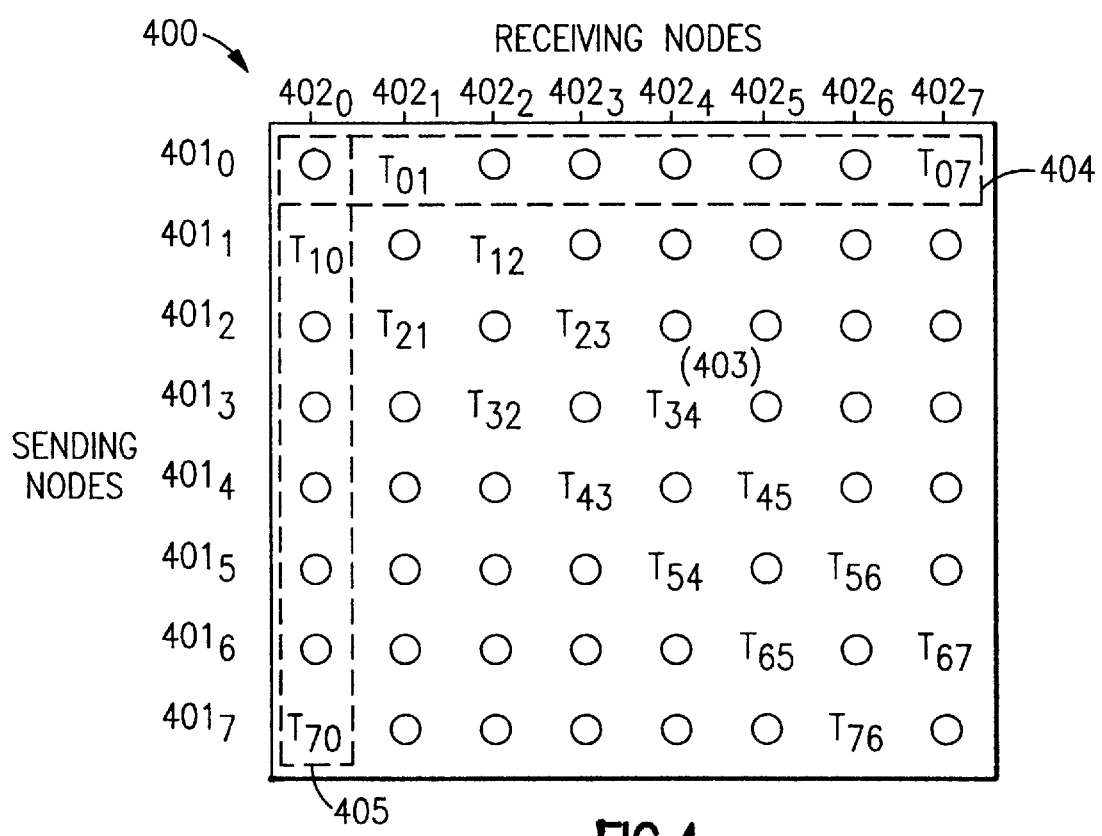
FIG. 4 illustrates an exemplary incidence graph for implementing a simple ring communication pattern or a simple operation pattern in a parallel processing system including seven processing nodes.

Turning now to our invention in greater detail, reference may be had to FIG. 4 which depicts a simple example of a two dimensional incidence graph 400 for a network having eight nodes and implementing the simple ring communication pattern 100 depicted in FIG. 1. The column and row headings each represent a processing node in the parallel processing system. Without loss of generality, the node representations comprising the row headings may be designated the "sending nodes" ($401_0$–$401_7$) wherein the subscripts each designate a different "sending" node in the parallel processing system. The sending nodes 0–7 are the nodes which will serve as the source of a message to be passed between a given two nodes. Correspondingly, the node representations comprising the column headings may be designated the "receiving nodes" ($402_0$–$402_7$). The receiving nodes are the nodes which serve as the destination to which a message passing between a given two nodes will travel. In our exemplary system, it is understood, that a given node (node 1 for example) may serve as a sending node for passage of certain messages (for example where node 1 passages a message to node 2) and may also serve a receiving node for the receipt of certain messages (for example where node 1 receives a message from node 2). Thus, the row representation corresponding to node 1 $401_1$ as a sending node is accompanied in the exemplary incidence graph 400 by a corresponding column representation corresponding to node 1 $402_1$ as a receiving node.

An incidence graph 400 as shown in FIG. 4 may be generated by a number of known computer-based implementations. For example, in U.S. Pat. No. 5,313,645, issued to Rolfe, entitled "Method For Interconnecting And System Of Interconnected Processing Elements By Controlling Network Density", (incorporated herein by reference), a network connection algorithm for establishing physical interconnections between nodes in a network while controlling the network density is disclosed. The patent teaches an algorithm, capable of computer program implementation, which defines the physical node interconnections over a distributed network of node, however, it is equally applicable to the generation of an array such as the illustrative incidence graph 400 depicting message routing between distributed nodes of a parallel computing system. Other methods may be devised for generating an exemplary incidence graph such as incidence graph 400 and as such may be considered to be included within the scope of the present invention.

As can be seen via reference to FIG. 4, the intersection of certain rows and columns in the incidence graph comprises a token "T" 403. The inclusion of the token may be used to indicate that a message is to be passed between the nodes represented by the row and column headings. For example, in FIG. 4 the token "$T_{34}$" 403 depicted at the intersection of row 3 column 4 may correspond to a message to be passed within the parallel processing system from processing node 3 to processing node 4. The included token in this illustrative example may be as simple as an indication at the intersection of a row heading and column heading simply connoting that a message is to be passed from the processing node corresponding to that row heading to the processing node corresponding to that column heading. Thus, the processing node represented by the row heading (or the sending node) (node 3 $401_3$ in this example) would perform a send operation and the processing node represented by the column heading (or the receiving node) (node 4 $402_4$ in this example) would perform a corresponding receive operation to enable passage of the message over the parallel system communication network. Where a "zero" is included at the intersection of a given row and column heading no message is to be passed from the processing node corresponding to the row heading to the processing node corresponding to the column heading. It is to be understood herein that the inclusion of a particular token at the intersection of a particular row and column heading of the incidence graph 400 may correspond to an instruction for the passage of a message between the two represented nodes whereas the inclusion of a different token or of no token therein may correspond to an instruction for no message passage therebetween.

In another, more sophisticated embodiment, the inclusion of a token may be used to more precisely define the communication operation between the processing nodes corresponding to the intersecting row and column. For example, the token included at a particular row and column heading intersection may be associated with parameters of the message to be passed between the represented processing nodes, such as the bit length or parity of the message to be passed. Additionally, or alternatively the token may be associated with the communication protocol under which the message is to be passed, for example, whether the message is to be passed via synchronous or asynchronous transmission, or whether the transmission of the message is to be timed, or any other characteristic that may be used to control the communication operation. Moreover, the token may be associated with an operation or instruction set to be performed at either the sending or receiving node upon the data transferred within the inter-node message, such as a cyclic redundancy check (CRC) to assess the integrity of the data received at the receiving node in comparison to the data sent or a calculation based upon the data received at the receiving node or performed upon data before transmittal from the sending node. It is further contemplated herein that via the use of such an association between the token and an instruction set, a parallel computer program of either the single-instruction multiple data stream (SIMD) or multiple-instruction multiple-data stream (MIMD) may be implemented based upon a corresponding incidence graph.

The above-described message passing implementation may further be iteratively implemented within a parallel computer system for purposes of testing the degradation of a networks message passing ability over time. In order to enact such a test, an exemplary incidence graph 400, defining a particularly useful communication pattern for the network of nodes, is implemented repeatedly by the nodes, and results of the ensuing communications are monitored to note whether the performance of routing over the network changes over time.

Figure 5:
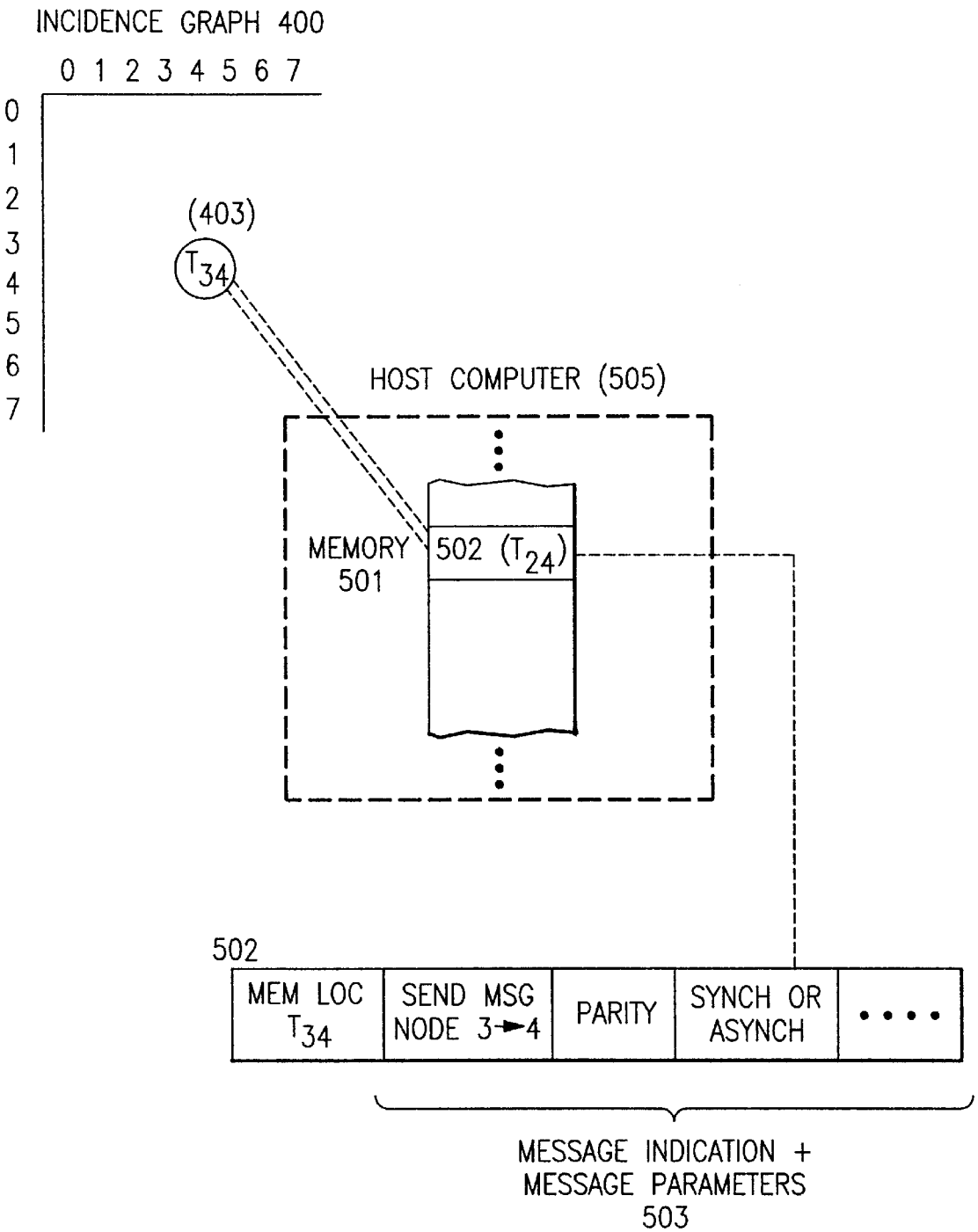
FIG. 5 illustrates the association of a token through host node memory with a message passing indication and message passing parameters.
Figure 6:
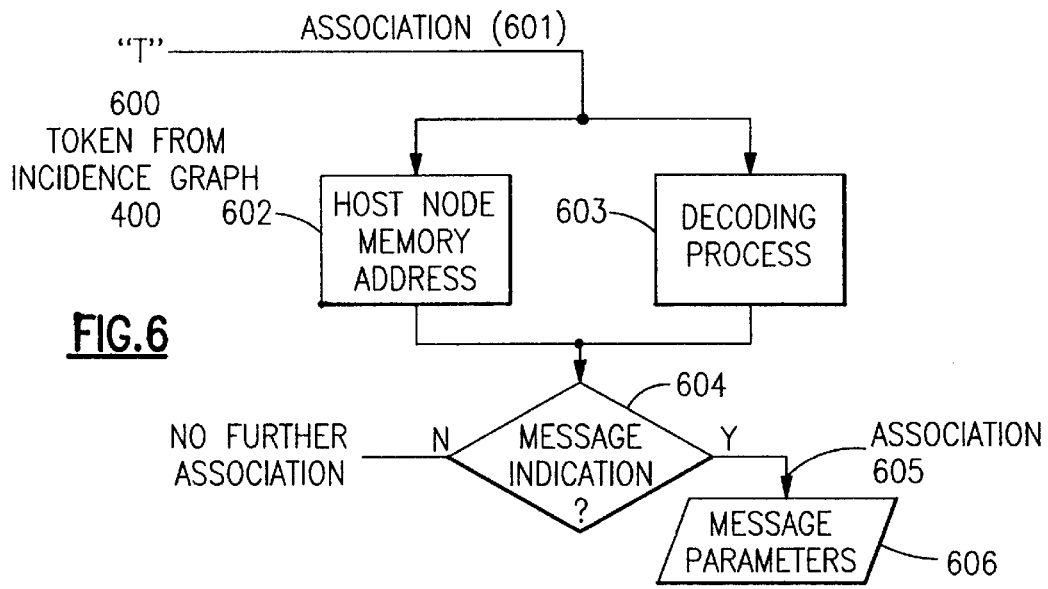
FIG. 6 further depicts a flow diagram for token association through with message indication and message parameters.

In operation, the aforementioned tokens located at the row column intersections of the incidence graph 400 could reference an address in a computer memory, or some special purpose hardware register or microcode location or the like, wherein information regarding the message passage protocol as previously described may be stored. Alternatively, the token may take the form of an encoded binary or hexadecimal word, which, upon decoding via hardware or software means, would yield values indicative of certain aspects of the communication protocol as previously described. For further examples of a tokenized interface see U.S. Pat. No. 5,485,626 entitled "Architectural Enhancements For Parallel Computer Systems Utilizing Encapsulation of Queuing Allowing Small Grain Processing" issued Jan. 16, 1996 (commonly assigned to the present assignee and incorporated herein by reference). For example, via reference to FIG. 5, an embodiment of the invention is illustrated wherein each token such as token $T_{34}$ 403 may reference a specific memory location 502 in a host computer 505 memory 501. The host computer 505 could be one of the plurality processing nodes in a parallel processing system represented by the row 401 and column 402 headings on the incidence graph 400 (i.e. nodes 0 through 7). The host computer memory address 502 referenced by a particular token 403 would contain the requisite data 503 for properly controlling the internode communication operation for the intersecting nodes. More generally, via reference to FIG. 6 the tokens 600 populating the incidence graph 400 are associated 601 either by reference to a memory address 602, or by a decoding process 603 to an indication 604 which determines whether a message is to be passed between the two intersecting nodes. If the message is to be passed, the tokens are further associated 605 with the requisite message parameters 606 (for example: parity, timed message passing or untimed, CRC upon receipt, etc.) for the execution of the communication operation and any operation ensuing therefrom.

Figure 7:
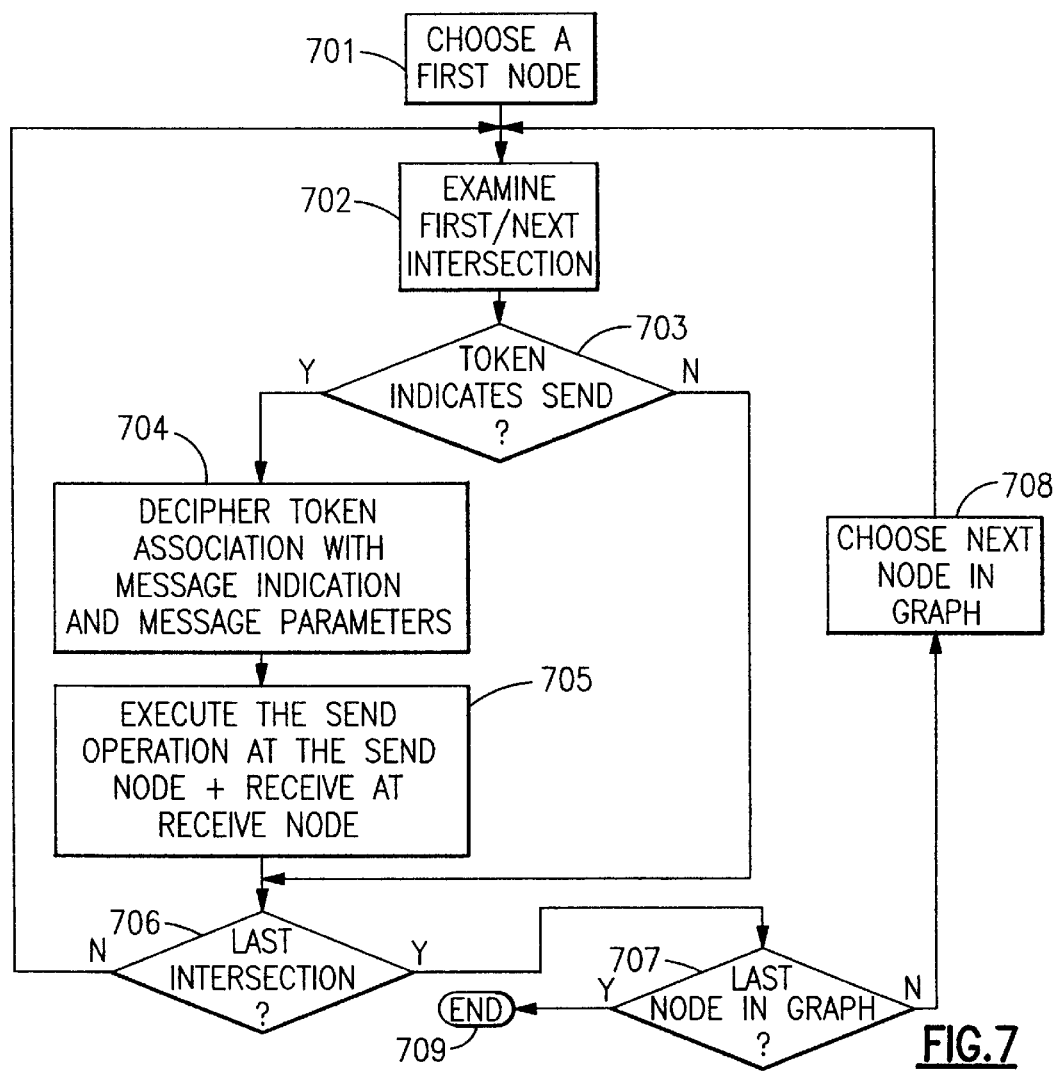
FIG. 7 illustrates a flow diagram for the examination of the intersections of an exemplary incidence graph, and the passing of messages between the nodes therein.

In order to implement the incidence graph based communication method described herein, each of the nodes represented on the incidence graph 400, must examine the graph to discern which operations it must perform. In an exemplary implementation, each node represented as a sending node on the incidence graph 400, examines its intersection with each receiving node thereon. For all nodes in the network, the flow diagram in FIG. 7 depicts the steps for utilizing an exemplary incidence graph 400 for enabling the exercise of the intended communication pattern 700. For a each node's representation on the incidence graph 400, the incidence graph intersections are examined to determine which other nodes, the node is to send messages to. Thus, in FIG. 7 without loss of generality, applied to incidence graph 400 in which row headings are defined as sending nodes and column headings as receiving nodes, in a first step 701 a first node (node zero $401_0$ for example) is chosen. For the chosen node, the first intersection across the row bearing that node as a heading is examined 702. If there is a token present indicating that a message is to be sent 703, the node proceeds 704 to decipher (602 or 603) the token association with the message indication 604 and the associated message parameters 605, and the node executes a send operation 705 sending a message to the node represented by the intersecting column heading which is instructed to perform a receive operation. Next in step 706, it must be determined whether the examined intersection was the last intersection in the given row. If on the other hand, the token is not associated with an indication that a message is to be sent in step 703, execution proceeds directly to step 706. If it is determined at step 706 that there are more intersections in the given row to examine, execution passes back to step 702 wherein the next intersection is examined. Alternatively, if the last intersection for the given row has been examined execution proceeds to step 707 wherein it is determined whether all of the nodes having row headings on the incidence graph 400 have been evaluated. If not, a next node (for example node 1 401₁) is chosen 708 and the execution returns to examination of the intersections of the newly chosen row 702. When the last node has been examined the operation reaches its completion 709. Of course, the same type of an operation may be undertaken in a column-wise examination of the incidence graph 400 wherein the token may instruct the node at the head of the column to perform a receive operation and the associated sending node is instructed to perform a send operation. Moreover, in an alternate embodiment of the incidence graph wherein column and row headings correspond to sending and receiving nodes respectively, the execution of the previous steps would proceed accordingly. As such the illustrative flow diagram 700 may be easily adapted to different incidence graphs and different implementations of a particular incidence graph and all are considered to be within the scope of the present invention.

A step-wise examination of the incidence graph 400 as depicted in FIG. 7 may be implemented via a parallel computer program running on the network of nodes, wherein each node in the network (for example: via reference to incidence graph 400, nodes 0 though 7) is provided with a copy of the incidence graph 400 stored in the memory of each processing node, or alternatively wherein a version of the incidence graph 400 is maintained in a commonly accessed memory location, such as the memory of a host node 501 that is read by each of the processing nodes in the network or wherein only those portions of the incidence graph which are of interest to a particular node are provided to or accessible to that node. For example, for node 0 on incidence graph 400 the node would have access to via the host node memory, or would store in its own memory, the portion of the incidence graph 400 including the vector 404 comprising the columnar intersections of the row headed by 401₀ and on the incidence graph 400 and the vector comprising the row intersections of the column headed by 402₀ on the incidence graph. In any case, as long as each node in the network has access to or stores at least the relevant portion of the incidence graph for that node, each node, via execution of an identical set of instructions, may engage in its particular communication operation which is distinct from the communication pattern for each of the other nodes in the network. For example, node 1, via access to the incidence graph 400 (or at least access to row 1 and column 1 of the incidence graph 400), can perform a set of instructions to enable the passage of messages determined in the incidence graph, (i.e. the passage of messages to and from nodes 0 and 2), while via access to the same incidence graph 400 and through the identical set of instructions, node 2 is permitted to enact its different communication operations as dictated by the contents of the incidence graph 400 (i.e. the passage of messages to and from nodes 1 and 3).

Figure 8:
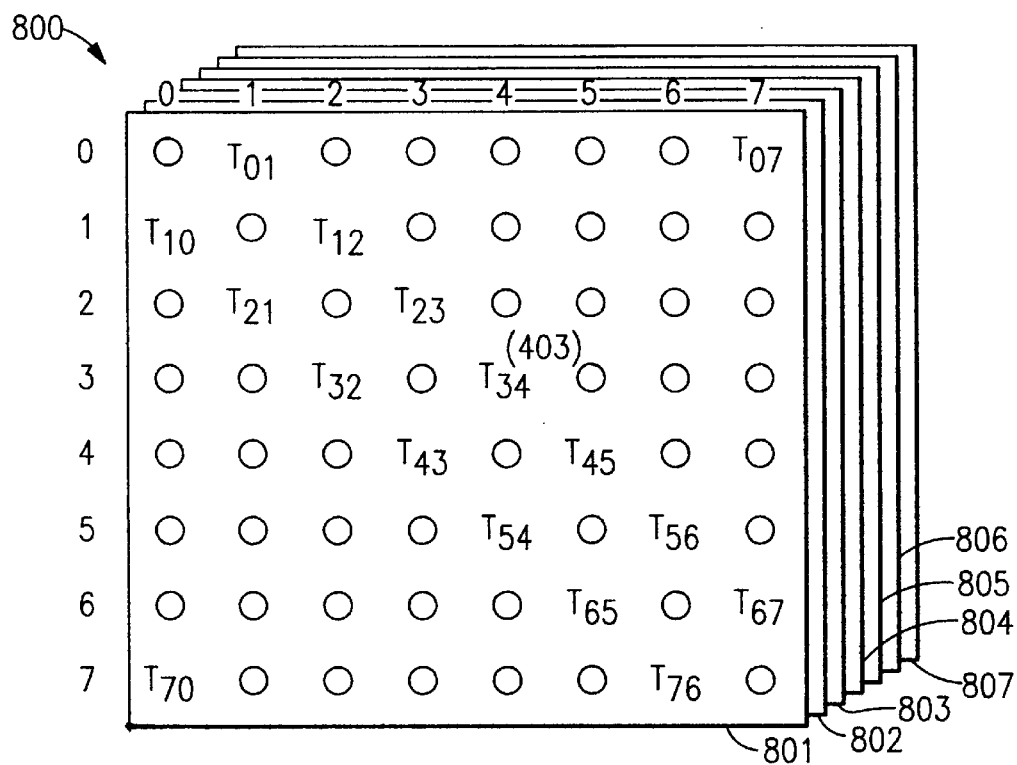
FIG. 8 depicts a three dimensional array comprising successive versions of incidence graphs, each comprising its own communication pattern for the multiple node network.

The ability to generate the exemplary incidence graph 400 via a computer implemented algorithm, such as the exemplary algorithm described in U.S. Pat. No. 5,313,645, facilitates the generation of a large number of incidence graphs, each containing different communication patterns which may be of interest to a user of a parallel computing system. FIG. 8 depicts a set of two dimensional incidence graphs forming a three dimensional array 800, with the successive versions 801 through 807 of two dimensional incidence graphs such as the incidence graph 400 depicted in FIG. 4 forming the third dimension of the three dimensional array 800. In practice, a number of incidence graphs may be used to successively test a number of important communications patterns against the network of nodes in a similar manner as has been described for the single incidence graph 400. Furthermore, the set of instructions executed at each of the processing nodes remains the same regardless of the contents of the incidence graph, such that multiple incidence graphs may be used as input to the same message passing program which thereby will generate different communication patterns for the network.

Figure 9:
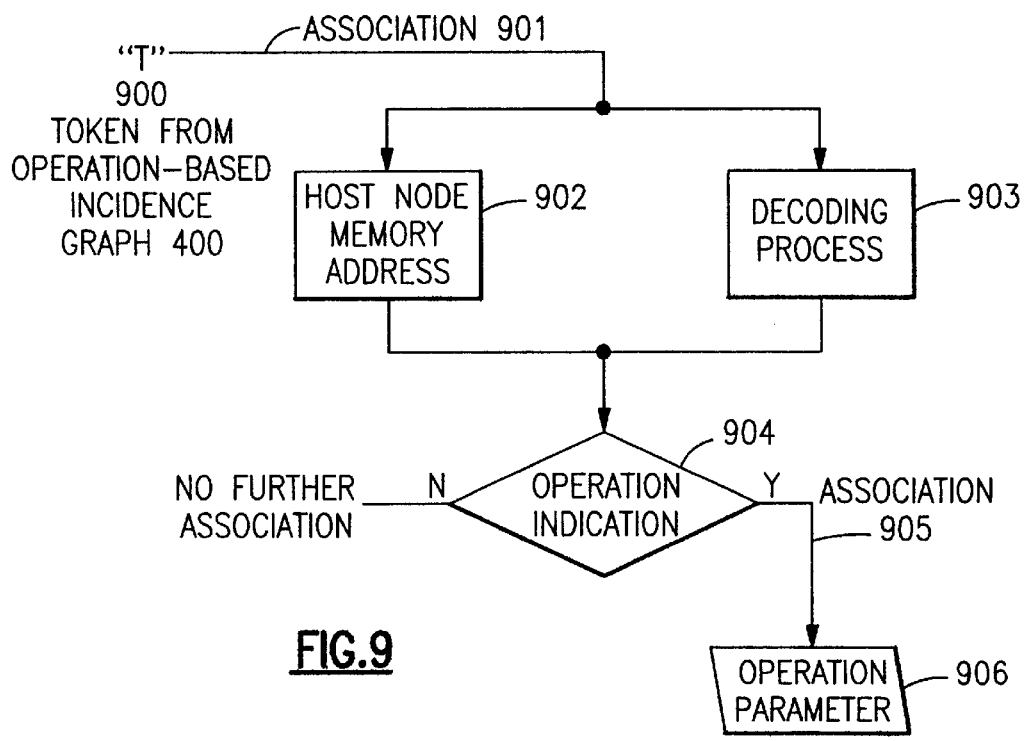
FIG. 9 depicts a flow diagram for token association through with operation indication and operation parameters for non-communication operations.

In an alternative embodiment, the incidence graph may be populated with tokens associated with indications of whether non-communication based operations are to be performed at each node. Thus, the exemplary incidence graph 400 may contain a token at the intersection of nodes 1 and 2 ($T_{12}$) which instructs the intersecting nodes to perform operations such as fast fourrier transforms, or bus diagnostics or other such operations not involving the passing of messages between the nodes. As may be seen in FIG. 9, the tokens 900 may be associated 901, via the aforementioned token association scheme of memory address reference 902 or decoding 903 with an indication 904 as to whether operations are to be performed at the intersecting nodes and further associated 905 any operation parameters 906 such as operands, that may be required for performance of the operations. In this manner, the incidence graph 400 may be utilized to permit message passing as well as discrete non-communication based operations at each node based upon the association of the particular token at each intersection. Moreover, if it is desired to perform message passing and other operations between two intersecting nodes, this may also be achieved by associating the corresponding token to the multiple communications and non-communications operations.

Figure 10:
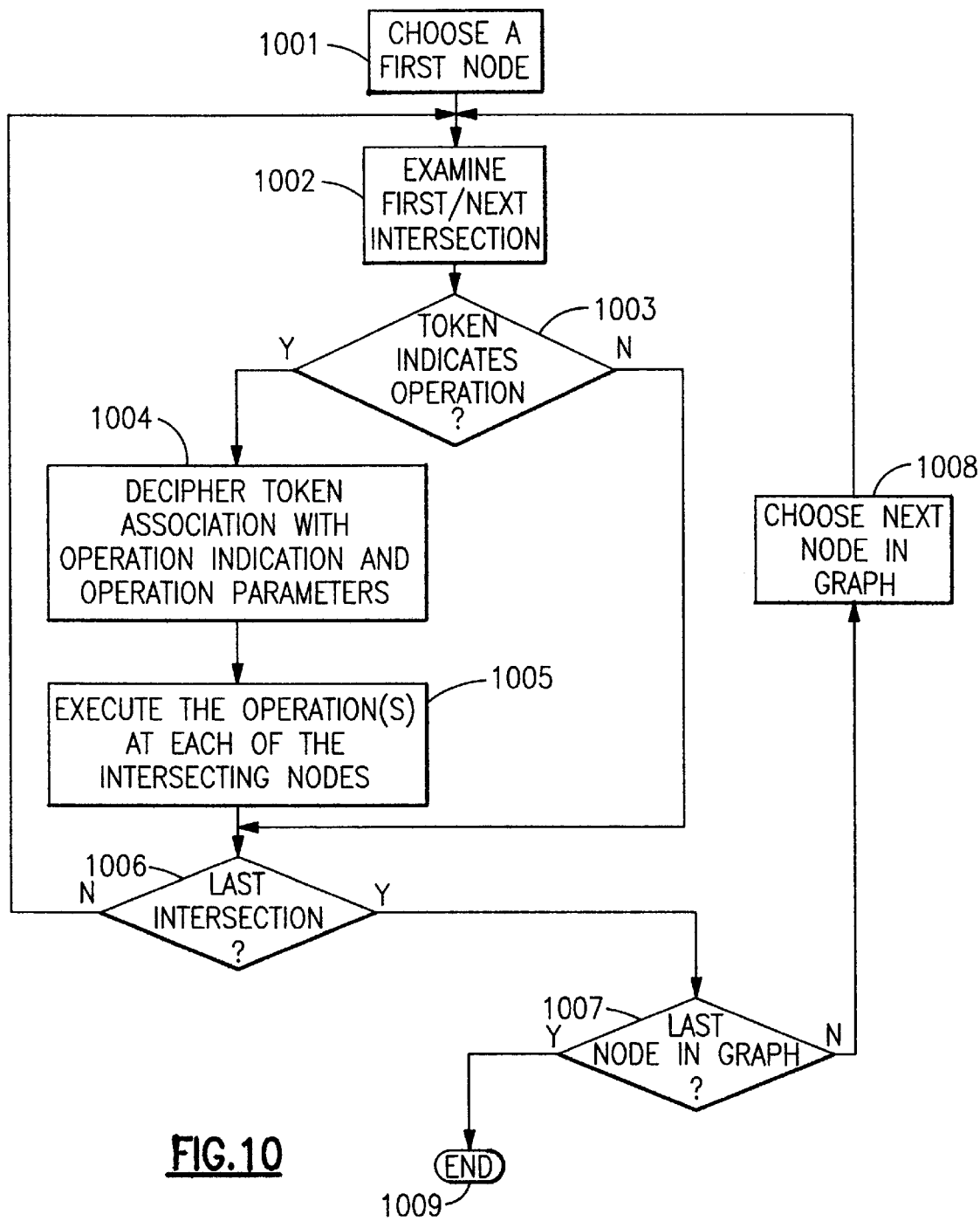
FIG. 10 illustrates a flow diagram for the examination of the intersections of an exemplary incidence graph, and the execution of non-communication operations at the nodes thereof.

In practice step-wise the incidence graph based examination for enabling operations at nodes in a multi-node network would proceed in a manner analogous to that for the communication of messages between nodes in the network. FIG. 10 illustrates an exemplary flow diagram 1000 for the sequence of steps required at each node in the network for using an incidence graph to enable operations in the network. In a first step 1001 a first node (node zero 401₀ for example) is chosen. For the chosen node, the first intersection across the row bearing that node as a heading is examined 1002. If there is a token present indicating that an operation is to be performed 1003, the node proceeds to decipher 1004 (902 or 903) the token association with the operation indication 904 and the associated operation parameters 906, and the node executes the operation as does the node represented by the intersecting column heading which may be instructed to perform the same or a different operation depending upon which operation parameters 906 have been associated with the token. Next in step 1005, it must be determined whether the examined intersection was the last intersection in the given row. If on the other hand, the token is not associated with an indication that an operation is to be performed in step 1003, execution proceeds directly to step 1006. If it is determined at step 1006 that there are more intersections in the given row to examine, execution passes back to step 1002 wherein the next intersection is examined. Alternatively, if the last intersection for the given row has been examined execution proceeds to step 1007 wherein it is determined whether all of the nodes having row headings on the incidence graph 400 have been evaluated. If not, a next node (for example node 1 401$_1$) is chosen 1008 and the execution returns to examination of the intersections of the newly chosen row 1002. When the last node has been examined the operation reaches its completion 1009. Of course, the same type of an operation may be undertaken in a column-wise examination of the incidence graph wherein the token may instruct the node at the head of the column and at the head of the intersecting row to perform the indicated operation(s).

In the same manner as previously indicated for the communications-based operations, the step-wise evaluation of the incidence graph 400 for non-communication based operations may b implemented by a parallel computer program running on the network of nodes wherein each node in the network (i.e. via reference to incidence graph 400 nodes 0 through 7) is provided with a copy of the incidence graph 400, or alternatively wherein a version of the incidence graph 400 is maintained in a commonly accessed memory location, such as the memory 502 of a host node 501 that is read by each of the processing nodes in the network or wherein only those portions of the incidence graph which are of interest to a particular node are provided to or accessible to that node. For example for node 0 in incidence graph 400 the node either has access to the host node or stores in its own memory, the portion of the incidence graph including the vector 404 comprising the columnar intersections of the row headed by 401$_0$ on the incidence graph 400 and the vector 405 comprising the row intersections of the column headed by 402$_0$ on the incidence graph 400. In any case, so long as each node in the network has access to or stores the relevant portion of the incidence graph 400 for that particular node, each node, via execution of an identical set of instructions may undertake its particular non-communication operations as indicated by the associated tokens. Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention as defined in the following claims.

The following claims should be construed to maintain the proper protection for the invention first disclosed.

Having described our invention, what we claim as new and desired to secure by Letters Patent is as follows:

1. A method for performing operations in a network of nodes, wherein each of said nodes may be instructed to perform an operation, the method comprising the steps of:
   arranging representations of said nodes as column headings and as row headings in a two dimensional array with a representation of each node appearing once as a column heading and once as a row heading;
   placing a token at the intersections of the node representations in the two dimensional array, wherein said token may be associated with an indication of whether operations are to be performed at each of the nodes represented by the intersecting node representations, and wherein if operations are to be performed, the token may further be associated with operation parameters for the operations to be performed at each of the nodes, the so-created array embodying an operation pattern for the performance of operations at the nodes of the network;
   associating each of said tokens with said indications and said operation parameters; and
   performing operations at said nodes having said tokens at the intersections of their node representations in the two dimensional array if said token at the intersection of the node representations is associated with the indication that an operations are to be performed, the performance of the operations being defined by the operation parameters associated with said token.

2. The method according to claim 1 wherein each of said nodes stores at least a portion of the two-dimensional array corresponding to the tokens associated with the indications of operations to be performed at said node.

3. A method according to claim 1 wherein if no operation is to be performed at two of said nodes, the token at the intersection of the two corresponding node representations is not associated with said indication and is not associated with said message parameters.

4. A method according to claim 1 wherein each of said nodes may access a memory location in a host node wherein is stored said two dimensional array.

5. A method according to claim 1 wherein the two dimensional array is generated by a computer program.

6. A method according to claim 1 wherein each of said nodes in said network examines said two dimensional array according to an identical set of instructions executed by each of said nodes and wherein each of said nodes, via said execution of said instructions, is capable of performing operations in accordance with the association of the tokens in the two dimensional array.

7. A method according to claim 1 wherein said network includes a host node, having a host-node memory for providing the indications and said operation parameters for defining the performance of operations at the nodes in the network, and wherein said token placed at the intersection of the node representations for nodes at which operations are to be performed is an address of the host-node memory in which the indications and said operation parameters are stored, the method further including the steps of:
   placing the indications and said operation parameters in the host node memory at the host node memory addresses indicated by each of the tokens at the intersection of the node representations in the two dimensional array for nodes which are to perform operations; and
   retrieving from said host-node memory the indications and said operation parameters placed at the host node memory addresses indicated by each of the tokens for each of said nodes in said network.

8. A method according to claim 1 wherein said token placed at the intersection of the node representations is an encoded word capable of being decoded by said nodes, to determine said indication of whether operations are to be performed by said nodes and to determine said operation parameters associated with the operations to be performed at the nodes.

9. A method according to claim 1 wherein said operation parameters include the type of operations to be performed at the nodes.

10. A method according to claim 1 wherein said operation parameters include the operands required for operations to be performed at the nodes.

11. A method according to claim 9 wherein one of said tokens may be associated with a first operation type for the node corresponding to one of the interesting node representations, and wherein the same one of said tokens may be associated with a second operation type for the node corresponding to the other intersecting node representation.

* * * * *